(12) United States Patent
Josephsen et al.

(10) Patent No.: US 7,612,898 B2
(45) Date of Patent: Nov. 3, 2009

(54) HARD IMAGING SYSTEMS, ARTICLES OF MANUFACTURE, AND HARD IMAGING METHODS

(75) Inventors: Mark M Josephsen, Boise, ID (US); Curtis Reese, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1123 days.

(21) Appl. No.: 10/427,596

(22) Filed: Apr. 30, 2003

(65) Prior Publication Data

US 2004/0218202 A1 Nov. 4, 2004

(51) Int. Cl.
*G06F 15/00* (2006.01)
*B41J 9/44* (2006.01)

(52) U.S. Cl. ...................... 358/1.13; 400/61

(58) Field of Classification Search ................ 358/1.13, 358/1.14, 1.15, 1.16, 1.18, 3.23, 3.06, 522, 358/520, 1.9, 1.1; 400/61, 70, 63, 76; 715/505, 715/507, 523; 399/12, 24; 345/502, 551, 345/467; 341/51, 107
See application file for complete search history.

(56) References Cited

U.S. PATENT DOCUMENTS

| | | | |
|---|---|---|---|
| 5,701,183 | A | 12/1997 | Bellemare et al. |
| 5,978,477 | A | 11/1999 | Hull et al. |
| 6,295,133 | B1 * | 9/2001 | Bloomquist et al. .......... 358/1.1 |
| 2001/0051963 | A1 * | 12/2001 | Nishikawa .................. 707/527 |
| 2003/0161002 | A1 * | 8/2003 | Nishiwaki et al. .......... 358/1.15 |

OTHER PUBLICATIONS

"HP ChaiServer Guide, Release 3.1"; http://user.devnet.external.hp.com/site/shai/csguide/chaiserverguide/home.html; Jul. 23, 2002; 2 pps.
"HP ChaiServer Guide, Release 3.1; General Overview of HP ChaiServer"; http://user.devnet.external.hp.com/site/shai/csguide/chaiserverguide/Overview.html; Jul. 23, 2002; 7 pps.
"HP ChaiServer Guide, Release 3.1; Install and Start ChaiServer"; http://user.devnet.external.hp.com/site/shai/csguide/chaiserverguide/Install_Start_ChaiServer.html; Jul. 23, 2002; 18 pps.
"HP ChaiServer Guide, Release 3.1; Load and Run ChaiServices"; http://user.devnet.external.hp.com/site/shai/csguide/chaiserverguide/Load_Run_ChaiServices.html; Jul. 23, 2002; 68 pps.
"HP ChaiServer Guide, Release 3.1; Develop Custom ChaiServices"; http://user.devnet.external.hp.com/site/shai/csguide/chaiserverguide/Develop_Custom_ChaiServices.html; Jul. 23, 2002; 17 pps.

(Continued)

*Primary Examiner*—Saeid Ebrahimi Dehkordy

(57) ABSTRACT

Hard imaging systems, articles of manufacture, and hard imaging methods are described. According to one aspect, a hard imaging system includes an image engine configured to form a hard image upon media, processing circuitry configured to access image data corresponding to the hard image, to process the image data to provide raster data, to output the raster data to the image engine, and to encapsulate the raster data, wherein the image engine is configured to form the hard image responsive to the raster data during a first imaging operation, and wherein the encapsulated raster data comprises data which may be utilized to generate the hard image formed by the image engine during a second imaging operation different than the first imaging operation.

8 Claims, 3 Drawing Sheets

OTHER PUBLICATIONS

"HP ChaiServer Guide, Release 3.1; Integrate ChaiServers"; http://user.devnet.external.hp.com/site/shai/csguide/chaiserverguide/Integrate_ChaiServers.html; Jul. 23, 2002; 21 pps.
"HP ChaiServer Guide, Release 3.1; Index of Figures, Images, Tables"; http://user.devnet.external.hp.com/site/shai/csguide/chaiserverguide/Index_Figures_Tables.html; Jul. 23, 2002; 11 pps.
"HP ChaiServer Guide, Release 3.1; Links to Key Terms"; http://user.devnet.external.hp.com/site/shai/csguide/chaiserverguide/Links_Key_Terms.html; Jul. 23, 2002; 23 pps.
"Terms of Use"; http://user.devnet.external.hp.com/site/shai/csguide/chaiserverguide/terms.html; Jul. 23, 2002; 2 pps.
"Device Applications"; http://user.devnet.external.hp.com/site/chai/csguide/images/platform.gif; Jul. 23, 2002; 1 p.
"Engine Flow"; http://user.devnet.external.hp.com/site/chai/csguide/images/EngineFlowNumbered.gif; Jul. 23, 2002; 1 p.
http://user.devnet.external.hp.com/site/chai/csguide/images/PkgDepend.gif; Jul. 23, 2002; 1 p.
"Device Applications"; http://user.devnet.external.hp.com/site/chai/csguide/images/ChaiMailArch.gif; Jul. 23, 2002; 1 p.
http://user.devnet.external.hp.com/site/chai/csguide/images/chaipopup.gif; Jul. 23, 2002; 1 p.
http://user.devnet.external.hp.com/site/chai/csguide/images/nochaipopup.gif; Jul. 23, 2002; 1 p.
http://user.devnet.external.hp.com/site/chai/csguide/images/ChaiMailComun.gif; Jul. 23, 2002; 1 p.
http://user.devnet.external.hp.com/site/chai/csguide/images/nnm.gif; Jul. 23, 2002; 1 p.
http://user.devnet.external.hp.com/site/chai/csguide/images/ChaiMailFlow.gif; Jul. 23, 2002; 1 p.
"Browser MIB"; http://user.devnet.external.hp.com/site/chai/csguide/images/mibbrowser.jpg; Jul. 23, 2002; 1 p.
"15.13.192Segment106"; http://user.devnet.external.hp.com/site/chai/csguide/images/withchai.jpg; Jul. 23, 2002; 1 p.
"ChaiServer Homepage"; http://user.devnet.external.hp.com/site/chai/csguide/images/Homepage.gif; Jul. 23, 2002; 1 p.
"ChaiServer Homepage"; http://user.devnet.external.hp.com/site/chai/csguide/images/CSHomeWithEcho.gif; Jul. 23, 2002; 1 p.
"ChaiServer Package Loader"; http://user.devnet.external.hp.com/site/chai/csguide/images/CSPackageLoader.jpg; Jul. 23, 2002; 1 p.
"ChaiServer Package Loader"; http://user.devnet.external.hp.com/site/chai/csguide/images/LoaderStatusPage.gif; Jul. 23, 2002; 1 p.
"ChaiServer Package Loader"; http://user.devnet.external.hp.com/site/chai/csguide/images/LoaderWithEcho.jpg; Jul. 23, 2002; 1 p.
"Echo ChaiServer"; http://user.devnet.external.hp.com/site/chai/csguide/images/EchoPage.gif; Jul. 23, 2002; 1 p.
"Hello World"; http://user.devnet.external.hp.com/site/chai/csguide/images/HelloWorld.gif; Jul. 23, 2002; 1 p.
"Add Port"; http://user.devnet.external.hp.com/site/chai/csguide/images/AddPort.jpg; Jul. 23, 2002; 1 p.
"ChaiServer Gate Keeper"; http://user.devnet.external.hp.com/site/chai/csguide/images/GateKeeperHP.gif.jpg; Jul. 23, 2002; 1 p.
"ChaiAppliance Plug n Play Home Page"; http://user.devnet.external.hp.com/site/chai/csguide/images/CAPnPDARepository.gif; Jul. 23, 2002; 1 p.
"ChaiAppliance Plug n Play Home Page"; http://user.devnet.external.hp.com/site/chai/csguide/images/CAPnPSARRepository.gif; Jul. 23, 2002; 1 p.
"ChaiAppliance Plug n Play Home Page"; http://user.devnet.external.hp.com/site/chai/csguide/images/CAPnPUserAgent.gif; Jul. 23, 2002; 1 p.
"ChaiAppliance Plug n Play Home Page"; http://user.devnet.external.hp.com/site/chai/csguide/images/CAPnPSearch.gif; Jul. 23, 2002; 1 p.
"ChaiServer Administration"; http://user.devnet.external.hp.com/site/chai/csguide/images/CSAdminPage.gif; Jul. 23, 2002; 1 p.
"ChaiServer Configuration"; http://user.devnet.external.hp.com/site/chai/csguide/images/CSConfigPage.gif; Jul. 23, 2002; 1 p.
"ChaiServer Package Loader"; http://user.devnet.external.hp.com/site/chai/csguide/images/LoaderInstallPkg.jpg; Jul. 23, 2002; 1 p.
"Echo ChaiService"; http://user.devnet.external.hp.com/site/chai/csguide/images/EchoexportMethod.gif; Jul. 23, 2002; 1 p.
"Notifier ChaiService Configuration"; http://user.devnet.external.hp.com/site/chai/csguide/images/ProxyURL.gif; Jul. 23, 2002; 1 p.
"Notifier ChaiService Configuration"; http://user.devnet.external.hp.com/site/chai/csguide/images/SMTPhostgif.gif; Jul. 23, 2002; 1 p.
"Notifier ChaiService Configuration"; http://user.devnet.external.hp.com/site/chai/csguide/images/EventConfig.gif; Jul. 23, 2002; 1 p.
"Object List"; http://user.devnet.external.hp.com/site/chai/csguide/images/ObjectList.jpg; Jul. 23, 2002; 2 pps.
"Package Details"; http://user.devnet.external.hp.com/site/chai/csguide/images/PackageDetails.gif; Jul. 23, 2002; 1 p.
"System Log Administration"; http://user.devnet.external.hp.com/site/chai/csguide/images/SysLogAdmin.gif; Jul. 23, 2002; 2 pps.
"WebServer Admin"; http://user.devnet.external.hp.com/site/chai/csguide/images/WebServerAdmin.jpg; Jul. 23, 2002; 2 pps.
"ChaiSrvice Configuration"; http://user.devnet.external.hp.com/site/chai/csguide/images/ChaiServiceStubPage.jpg; Jul. 23, 2002; 2 pps.
"CodeGen Object"; http://user.devnet.external.hp.com/site/chai/csguide/images/CodeGen.gif; Jul. 23, 2002; 2 pps.
"A Scribble Applet"; http://user.devnet.external.hp.com/site/chai/csguide/images/ScribbleApp.gif; Jul. 23, 2002; 1 p.
"ChaiMail Configuration"; http://user.devnet.external.hp.com/site/chai/csguide/images/ChaiMailPOP.gif; Jul. 23, 2002; 1 p.
"ChaiMail Configuration"; http://user.devnet.external.hp.com/site/chai/csguide/images/ChaiMailUser.gif; Jul. 23, 2002; 1 p.
"SMTPHelper Configuration"; http://user.devnet.external.hp.com/site/chai/csguide/images/SMTPHelper.gif; Jul. 23, 2002; 1 p.
"HP Embedded Web Server for HP LaserJet Printers; User Guide"; Hewlett Packard Company; Jan. 2001; 62 pps.

* cited by examiner

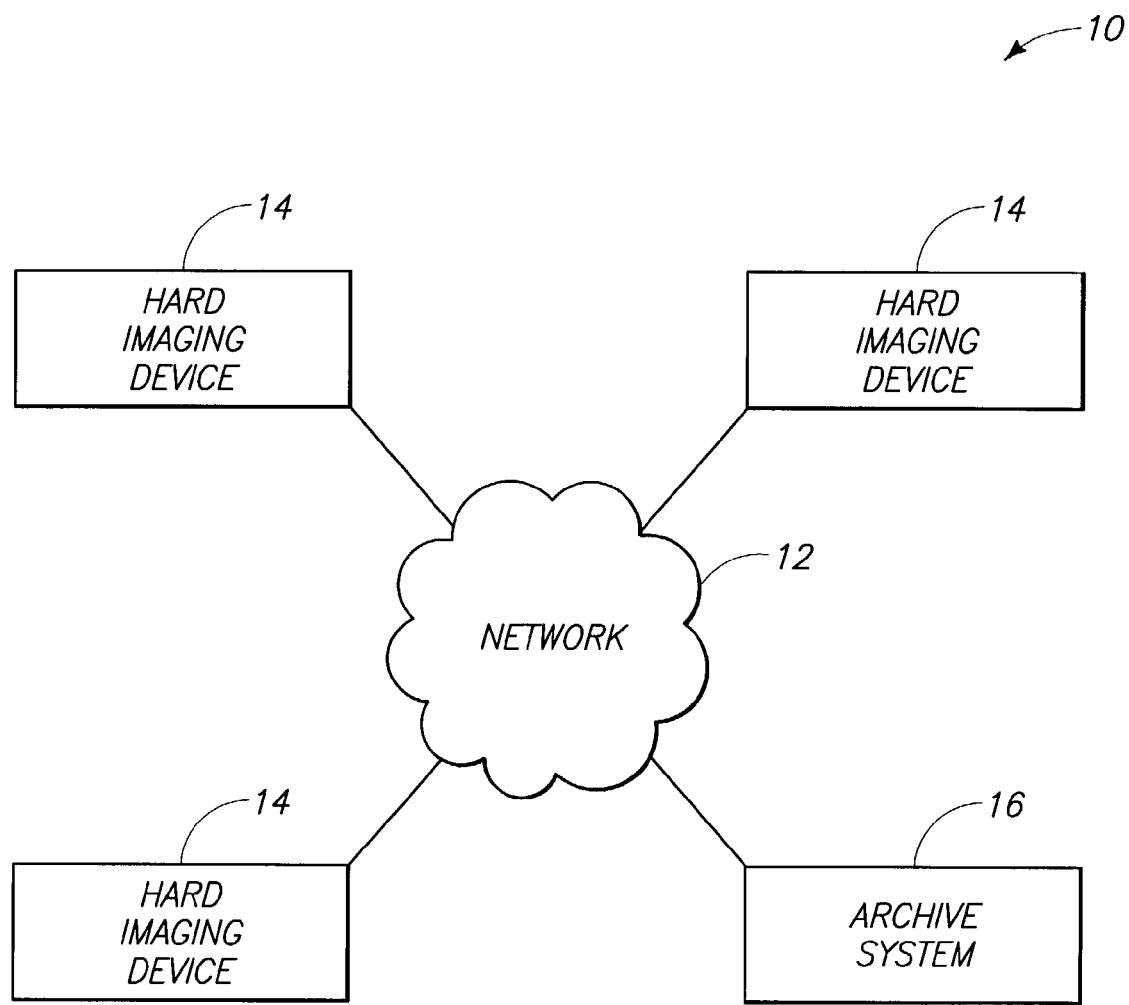

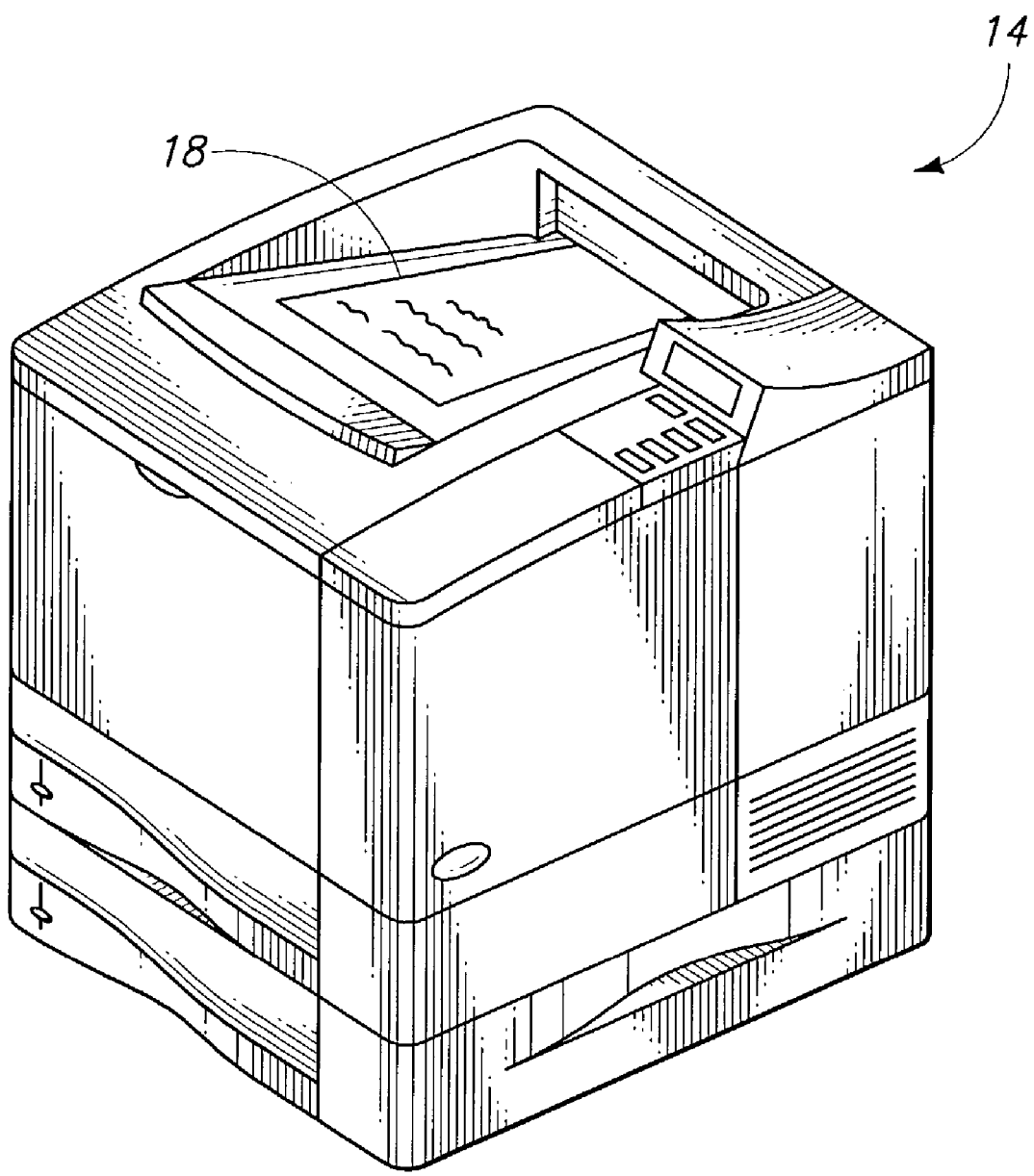

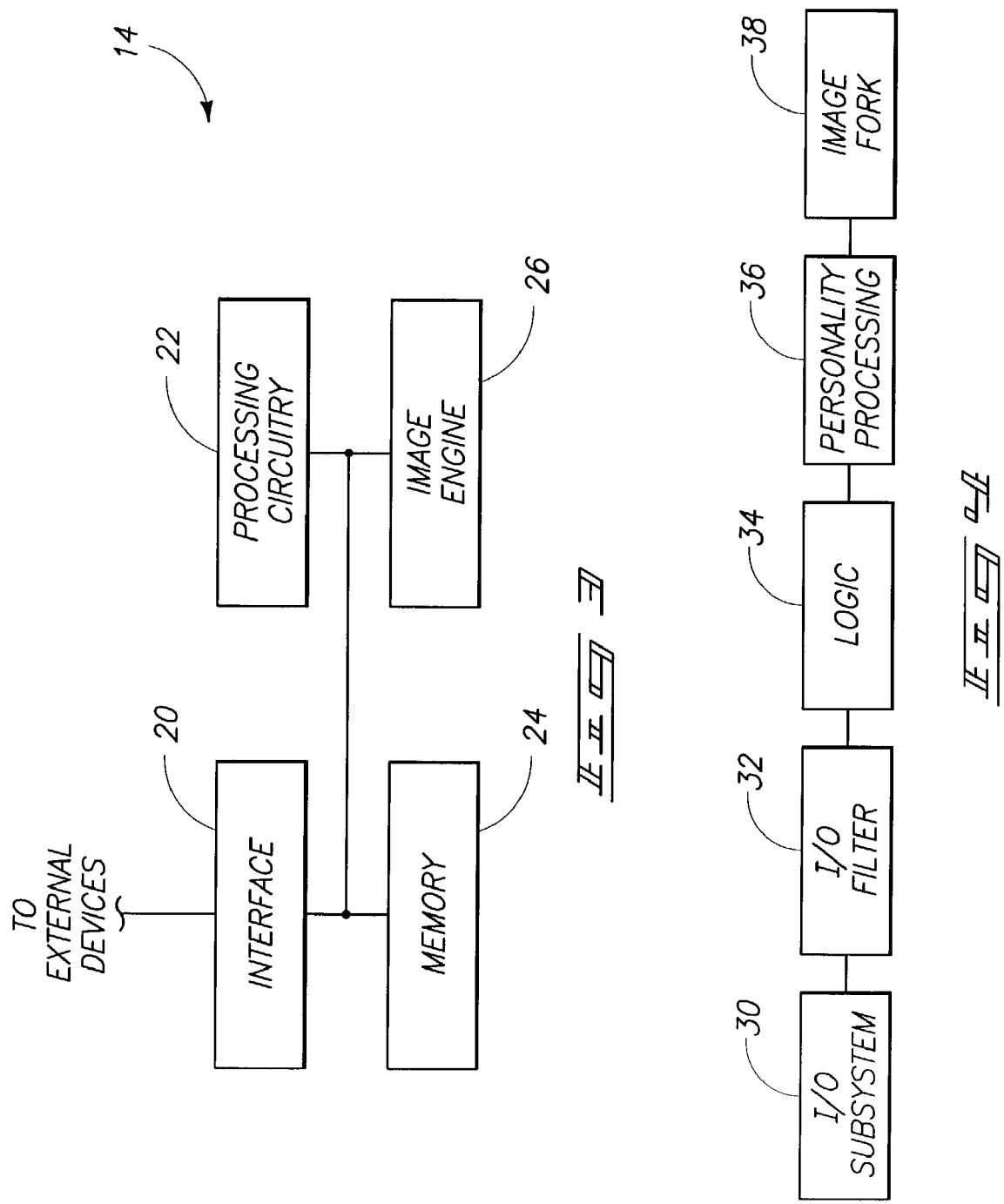

HARD IMAGING SYSTEMS, ARTICLES OF MANUFACTURE, AND HARD IMAGING METHODS

FIELD OF THE INVENTION

Aspects of the invention relate to hard imaging systems, articles of manufacture, and hard imaging methods.

BACKGROUND OF THE INVENTION

The advent and widespread adoption of networked systems has greatly facilitated data transfer capabilities. These systems facilitate dissemination of electronic data locally and across the world. Some systems implement local area networks, wide area networks, the internet, etc. to easily transfer data.

An increasing amount of communications which were traditionally paper-based are now wholly or partially implemented using electronic communications (e.g., electronic mail). However, numerous users of electronic communications may still rely, at least to some degree, upon fixed, tangible paper-based documents.

For example, many documents desired to be communicated electronically are paper-based. For electronic communication, these paper-based documents are converted into an electronic format. Some methods utilize a scanner or an office photocopier to convert the paper-based materials into electronic versions. These methods have the drawback of typically involving some degree of manual oversight or action. Accordingly, the conversions are susceptible to manual errors. In addition, image-quality degradation may be introduced due to the inherent imperfections of the scanning or copying device.

Aspects of the present invention provide improved methods and apparatus which overcome drawbacks of the above-described systems or methods.

DESCRIPTION OF THE DRAWINGS

FIG. 1 is a functional block diagram of a hard imaging system according to one embodiment.

FIG. 2 is an illustrative representation of a hard imaging device according to one embodiment.

FIG. 3 is a functional block diagram of a hard imaging device according to one embodiment.

FIG. 4 is a functional block diagram of programming of the hard imaging device according to one embodiment.

DETAILED DESCRIPTION OF THE INVENTION

According to one embodiment, a hard imaging system comprises an image engine configured to form a hard image upon media, processing circuitry configured to access image data corresponding to the hard image, to process the image data to provide raster data, to output the raster data to the image engine, and to encapsulate the raster data, wherein the image engine is configured to form the hard image responsive to the raster data during a first imaging operation, and wherein the encapsulated raster data comprises data which may be utilized to generate the hard image formed by the image engine during a second imaging operation different than the first imaging operation.

According to another embodiment, a hard imaging system comprises means for accessing image data corresponding to an image to be hard imaged, means for rasterizing the accessed image data and providing raster data, means for communicating the raster data to imaging means and interface means, wherein the imaging means comprises means for generating a hard image using the raster data, and wherein the interface means comprises means for communicating the raster data externally of the hard imaging system.

According to an additional embodiment, an article of manufacture comprises a processor-usable medium comprising processor-usable code configured to cause processing circuitry to access image data corresponding to an image to be hard imaged, rasterize the accessed image data to provide raster data, control the application of the raster data to an image engine of a hard imaging device configured to form a hard image of the raster data, encapsulate the raster data used to form the hard image to provide encapsulated raster data, and control communication of the encapsulated raster data externally of the hard imaging device.

According to another embodiment, a hard imaging method comprises accessing image data using a hard imaging device, the image data corresponding to a subject image to be hard imaged, rasterizing the image data to provide raster data, the rasterizing comprising using the hard imaging device, generating a first hard image of the subject image upon media using the raster data, the generating comprising using the hard imaging device, and providing the raster data into a form for usage to generate a second hard image of the subject image.

According to yet another embodiment of the invention, a hard imaging method comprises accessing the image data using a hard imaging device, wherein the hard imaging device comprises processing circuitry and an image engine, rasterizing the image data to provide raster data using the processing circuitry, providing the raster data from the processing circuitry to the image engine, using the image engine, generating a hard image according to the raster data, and outputting the raster data externally of the hard imaging device.

Referring to FIG. 1, an exemplary hard imaging system 10 is depicted in accordance with one embodiment. The illustrated system 10 includes a network 12, a plurality of hard imaging devices 14, and an archive system 16. Other system configurations are possible including for example, network 12, or other electronic data medium, coupled with a single hard imaging device 14.

Network 12 may be arranged in any appropriate configuration for communicating electronic data between coupled devices or systems. For example, network 12 may be implemented as a local area network, wide area network, and/or the internet, and comprise private and/or public portions.

Hard imaging devices 14 are configured to form hard images. Hard images comprise images physically rendered upon output media. Exemplary media includes sheet paper, roll paper, label, transparencies, envelopes, etc. Hard imaging devices 14 may have the same or different configurations in a given implementation of system 10. For example, hard imaging devices 14 may comprise a multiple function peripheral (MFP), printer, facsimile device, copier, or other appropriate configuration for generating hard images. As described below, hard imaging devices 14 may be implemented in a clustered arrangement in one embodiment. Additional details of at least one of hard imaging devices 14 are described below for implementing operations for providing electronic versions of hard images rendered by the device.

Archive system 16 is configured to receive and store electronic versions of the hard images. Archive system 16 may also manage the electronic versions including receiving and processing requests for certain electronic versions, and retrieving requested electronic versions. In one embodiment, archive system 16 may comprise a host personal computer including appropriate interfacing circuitry for implementing electrical communications with respect to network 12 or other communication medium. Archive system 16 may also include one or more storage component(s) for storing the electronic versions (e.g., memory storage, magnetic disks, optical disks, or other appropriate configuration for storing electrical data), and processing circuitry for controlling storage and access of electronic data (details of archive system 16 are not shown).

Referring to FIG. 2, an exemplary hard imaging device 14 is shown. The depicted hard imaging device 14 comprises a multiple function peripheral. Hard imaging device 14 accesses image data of a subject image (e.g., photograph, text document, line art, graphics, etc.) to be imaged and physically renders or otherwise forms hard images upon output media 18. Hard imaging device 14 may access image data including receiving image data from network 12, using an internal scanner (not shown), floppy or hard disk, or other appropriate source.

Referring to FIG. 3, additional details regarding an exemplary hard imaging device 14 are shown. The depicted hard imaging device comprises an interface 20, processing circuitry 22, a memory 24, and an image engine 26.

Interface 20 is configured to communicate electronic data externally of hard imaging device 14. In one embodiment, interface 20 is arranged to provide input/output communications with respect to external devices. Interface 20 may comprise a parallel port, USB port, EIO slot, network interface card (e.g., JetDirect™), IEEE 1394 connector, and/or other appropriate configuration capable of communicating electronic data.

Processing circuitry 22 is configured to process image data and control operations of hard imaging device 14 (e.g., communications, imaging, etc.). In one embodiment, processing circuitry 22 may comprise circuitry configured to implement desired programming. For example, processing circuitry 22 may be implemented as a microprocessor or other structure configured to execute executable instructions including, for example, software and/or firmware instructions. Other exemplary embodiments of processing circuitry 22 include hardware logic, PGA, FPGA, ASIC, or other structures. These examples of processing circuitry are for illustration and other configurations are possible for processing image data and controlling operations of hard imaging device 14.

Memory 24 is configured to store electronic data, programming such as executable instructions (e.g., software and/or firmware), and/or other digital information and may include processor-usable media. Processor-usable media includes any article of manufacture which can contain, store, or maintain programming for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a magnetic computer diskette (e.g., floppy diskette, zip disk, hard disk), random access memory, read only memory, flash memory, erasable programmable read only memory, compact disk, or other configurations capable of storing programming, data, or other digital information.

Image engine 26 is configured to form hard images upon output media 18. In one embodiment, image engine comprises development and fusing assemblies configured to form the hard images using a marking agent such as toner or ink. Image engine 26 may be configured to generate monochrome or color hard images. In printer embodiments of device 14, image engine 26 comprises a print engine.

In at least one embodiment, hard imaging device 14 is configured to generate electronic versions of hard images generated using image engine 26. The electronic versions may be used for clustered imaging operations, archiving (or other electronic storage) operations, electronic communication operations, or for other uses wherein an electronic version of a hard image is desired.

For example, processing circuitry 22 is configured to access and process image data corresponding to a hard image to be formed using image engine 26 in one implementation. Processing circuitry 22 may alter content of accessed image data. Exemplary altering of image data by circuitry 22 includes inserting watermarks, encryption, inserting a signature, etc.

Processing of the image data may also be implemented corresponding to the personality of the accessed image data. For example, processing circuitry 22 may implement conversion operations for the image data between different formats (e.g., convert image data from a received or input format to an output engine-ready format). In exemplary arrangements, accessed or input image data is provided as page description language (PDL) data (e.g., PJL, PCL, PostScript, etc.). Processing circuitry 22 may process the accessed PDL data to provide raster "engine-ready" data comprising a bitmap of pixels for use by image engine 26 to generate hard images.

Raster data is outputted by processing circuitry 22 to image engine 26 for physical rendering. In one embodiment, the raster data is provided directly (unchanged) to a video interface of image engine 26. Image engine 26 forms hard images responsive to the raster data and provides no additional manipulation or alteration of the data in one implementation. In one configuration, development and fusing operations within image engine 26 are initiated using the raster data to form respective hard images. Imaging of hard images by the image engine 26 responsive to the image data may be referred to as an initial or first imaging operation.

In at least one embodiment, the raster data corresponding to the formed hard images is also made available as electronic version(s) of the hard images formed using image engine 26. The electronic versions may be used in second or subsequent imaging operations to form hard and/or soft images corresponding to the hard images formed using image engine 26. The electronic versions correspond exactly to the hard images produced by engine 26 and may be used to produce exact copies of the formed hard images in one arrangement.

For example, in one implementation, processing circuitry 22 is configured to encapsulate the raster data which is also applied to image engine 26. The encapsulation may comprise providing the raster data in one of a plurality of file formats depending upon the intended subsequent usage of the raster data. Processing circuitry 22 may also compress the raster data. Exemplary encapsulated file formats include TIFF, JPEG, PDF, PCL 6 page description language, or other appropriate formats.

The encapsulated raster data may be stored within memory 24 of hard imaging device 14. Alternatively, or in addition to internal storage, processing circuitry 22 may also direct the encapsulated raster data to interface 20 for communication externally of hard imaging device 14.

For example, processing circuitry 22 may direct the encapsulated raster data to another one of the hard imaging devices 14 shown in FIG. 1 and coupled via network 12. In one embodiment, system 10 is configured to implement In-Printer Printer-and-Photocopy Clustering. The device 14 generating the encapsulated raster data may be referred to as a master device. Some jobs may be able to be hard imaged in a more expedient manner using a plurality of the devices 14 of system 10. In the exemplary clustering arrangement, the master device 14 may communicate the encapsulated raster data to slave devices 14 of system 10. Slave devices 14 may proceed to generate hard images responsive to the received raster data in subsequent hard imaging operations. In one embodiment, the hard images formed by slave devices 14 may correspond exactly to the hard images produced during the initial hard imaging operations by master device 14. The master device 14 may also communicate control information to the salve devices 14 (e.g., indicating the number of documents to be produced). System 10 configured in the exemplary clustering arrangement provides virtual copy speeds in excess of the performance of the individual devices 14.

Alternatively, or in addition to the exemplary clustering application, the encapsulated raster data may be used to implement archiving operations. Processing circuitry 22 may direct communication of the encapsulated raster data to archive system 16. Archive system 16 operates to receive the encapsulated raster data, and to store or archive the raster data for subsequent retrieval or access. At a later moment in time, archive system 16 may retrieve the stored encapsulated raster data and provide the retrieved data to an appropriate hard imaging device 14 for the formation of hard images in subsequent hard imaging operations. As mentioned above, the subsequently formed hard images may correspond exactly to hard images formed during the initial hard imaging operations. In some embodiments, network routing, compression and/or encryption techniques may be used to limit or minimize bandwidth impact or data exposure.

In additional aspects, the encapsulated raster data may be internally stored within memory 24 of one or more hard imaging device 14. For example, the encapsulated raster data me be archived or otherwise stored using memory 24 of device 14 that generated the encapsulated raster data. The internally stored data may be retrieved for subsequent imaging using the respective device 14 and/or external communication of the data. The exemplary internal storage may be used in addition to other operations described herein including external communication of the encapsulated raster data (e.g., for external archiving, printing, etc.).

As described above in the exemplary configurations, subsequent imaging operations may be performed using the encapsulated raster data. Subsequent imaging operations include accessing the encapsulated raster data and forming subsequent hard images using the encapsulated raster data which correspond to hard images produced during the initial imaging operations. The subsequently imaged hard images may be exact reproductions of the hard images formed during the initial imaging operations in at least one embodiment. Some embodiments described above utilize encapsulated raster data for subsequent imaging operations. In other embodiments, no encapsulation of the raster data is provided before the subsequent imaging operations.

At least some data processing by a given hard imaging device 14 may be omitted during subsequent hard imaging operations. More specifically, the raster data is already in a form ready for imaging in described examples. In one embodiment, the device 14 performing the subsequent hard imaging operations may access the raster data, identify the data as already rasterized, and extract and provide the raster data to the respective image engine 26. Accordingly, at least some data processing (e.g., rasterization operations) may be omitted during the subsequent hard imaging operations since the raster,data is already in a form for instant hard imaging.

Referring to FIG. 4, exemplary programming of hard imaging device 14 is shown and comprises I/O subsystem 30, I/O filter 32, logic 34, personality processing 36, and an image fork 38. The illustrated exemplary programming comprises executable instructions implemented as firmware. Other arrangements are possible.

I/O subsystem 30 configures the processing circuitry 22 to access image data for a plurality of jobs and to maintain image data of respective jobs aligned for processing within the image forming device 14. For example, I/O subsystem 30 may access image data of a plurality of image jobs from different interface components (e.g., USB port and parallel port) and provide processing of the image data in the respective appropriate jobs (i.e., avoiding mixing of image data of different jobs).

I/O filter 32 configures the processing circuitry 22 to provide any desired altering or manipulation of content of the image data. For example, decryption/encryption operations may be performed, a watermark image added, an image of a signature added, etc.

Logic 34 identifies the type of image data and controls the routing of the image data for further processing. For example, logic 34 may identify a type of page description language of the image data and forward the image data for appropriate downstream processing.

Personality processing 36 corresponds to the identified type of the image data. For example, PJL, PCL, PostScript or processing according to other personality types may be provided responsive to identification by logic 34. Personality processing 36 outputs raster data in the exemplary embodiment.

Image fork 38 is configured to implement encapsulation and/or compression operations of the raster data. Image fork 38 is configured to output raster data directly to a video interface of the image engine 26 and to also provide the raster data to interface 20 for communication externally of the hard imaging device 14.

As described herein, exemplary aspects facilitate provision of electronic versions of hard images generated by a hard imaging device 14. As mentioned above, the hard imaging device 14 may alter or manipulate the content of the image data, and at least some of the aspects enable generation of the electronic versions after the altering or manipulation. Accordingly, in some arrangements, electronic versions of the actual hard images formed by the image engine 26 may be provided, even if the content of the image data is altered or manipulated by device 14. In addition, exemplary aspects described herein avoid the drawbacks associated with scanning of already formed hard images (e.g., manual operation, high probability of errors, image degradation, additional hardware overhead, etc.). Generating the electronic versions using the hard imaging device 14 ensures accuracy of the data and permits automated processing in some configurations. For the exemplary clustered configurations described herein, built-in redundancy is also provided.

The protection sought is not to be limited to the disclosed embodiments, which are given by way of example only, but instead is to be limited only by the scope of the appended claims.

What is claimed is:

1. A hard imaging method comprising:
    accessing image data using a hard imaging device, the image data corresponding to a subject image to be hard imaged;
    rasterizing the image data to provide raster data, the rasterizing comprising using the hard imaging device;
    generating a first hard image of the subject image upon media using the raster data, the generating comprising using the hard imaging device; and providing the raster data into a form for usage to generate a second hard image of the subject image.

2. The method of claim 1 further comprising altering content of the image data using the hard imaging device before the rasterizing.

3. The method of claim 1 wherein the providing comprises encapsulating the raster data.

4. The method of claim 1 further comprising accessing the provided raster data, bypassing any further rasterizing, and forming the second hard image.

5. The method of claim 1 wherein the providing comprises encapsulating and compressing the raster data.

6. The method of claim 1 further comprising communicating the raster data externally of the hard imaging device after the providing.

7. The method of claim 1 further comprising:

communicating the raster data externally of the hard imaging device after the providing; and archiving the raster data after the communicating.

8. The method of claim 1 further comprising:

communicating the raster data externally of the hard imaging device after the providing;

accessing the communicated raster data using another hard imaging device; and forming the second hard image using the another hard imaging device.

\* \* \* \* \*